(12) United States Patent
McConnell

(10) Patent No.: US 10,526,054 B2
(45) Date of Patent: *Jan. 7, 2020

(54) PIPE-LAYING VEHICLE WITH ROTATOR PLATFORM LEVELING SYSTEM

(71) Applicant: Miller Industries Towing Equipment, Inc., Ooltewah, TN (US)

(72) Inventor: Ralph Edward McConnell, Chattanooga, TN (US)

(73) Assignee: Miller Industries Towing Equipment, Inc., Ooltewah, TN (US)

(*) Notice: Subject to any disclaimer, the term of this patent is extended or adjusted under 35 U.S.C. 154(b) by 66 days.

This patent is subject to a terminal disclaimer.

(21) Appl. No.: 16/267,839

(22) Filed: Feb. 5, 2019

(65) Prior Publication Data

US 2019/0168846 A1    Jun. 6, 2019

Related U.S. Application Data

(63) Continuation of application No. 15/794,446, filed on Oct. 26, 2017, now Pat. No. 10,220,921.

(51) Int. Cl.
*F16L 1/028* (2006.01)
*B60P 1/54* (2006.01)
(Continued)

(52) U.S. Cl.
CPC ............ *B63B 35/03* (2013.01); *B60P 1/5428* (2013.01); *B63B 27/10* (2013.01); *B66C 1/14* (2013.01);
(Continued)

(58) Field of Classification Search
CPC ....... B63B 35/03; B63B 27/10; B60P 1/5428; B66C 1/14; B66C 13/06; B66C 13/08; F16L 1/028; E02F 5/10
See application file for complete search history.

(56) References Cited

U.S. PATENT DOCUMENTS 2,789,716 A    4/1957   Wolf
3,325,029 A    6/1967   Rigsby
(Continued)

FOREIGN PATENT DOCUMENTS

AU    2009230812    2/2011
CA    2631480       11/2009
(Continued)

OTHER PUBLICATIONS

Range Diagram and Lifting Capacity (TEREX) Jul. 2016, Retrieved from the internet on Oct. 15, 2018, URL: <https://www.getwoodcrane.com/wp-content/uploads/2016/07/Terex_T340.pdf>.
(Continued)

*Primary Examiner* — Benjamin F Fiorello
(74) *Attorney, Agent, or Firm* — Michael P. Mazza, LLC

(57) ABSTRACT

A self-propelled vehicle used to lay pipe sections within trenches located on sloped terrain, and a method for using it, including: an undercarriage carrying a vehicle chassis and capable of climbing sloped terrain; a rotating platform which can be maintained level relative to the sloped terrain; and a boom with an angled boom head, capable of using two independent winch cables to lift and position individual pipe sections having differing lengths and diameters. The vehicle may be used to sequentially lift two or more pipe sections, one at a time, and to swing and position the pipe sections in a trench, end-to-end.

20 Claims, 12 Drawing Sheets

(51) Int. Cl.

| | |
|---|---|
| *B63B 35/03* | (2006.01) |
| *B63B 27/10* | (2006.01) |
| *B66C 13/08* | (2006.01) |
| *B66C 1/14* | (2006.01) |
| *B66C 23/42* | (2006.01) |
| *B66C 23/66* | (2006.01) |
| *B66C 23/62* | (2006.01) |
| *B66C 23/70* | (2006.01) |
| *E02F 5/10* | (2006.01) |
| *B66C 13/06* | (2006.01) |
| *F16L 1/06* | (2006.01) |

(52) U.S. Cl.
CPC .............. *B66C 13/08* (2013.01); *B66C 23/42* (2013.01); *B66C 23/62* (2013.01); *B66C 23/66* (2013.01); *B66C 23/705* (2013.01); *F16L 1/028* (2013.01); *B66C 13/06* (2013.01); *B66C 2700/035* (2013.01); *E02F 5/10* (2013.01); *F16L 1/06* (2013.01)

(56) References Cited

U.S. PATENT DOCUMENTS

| | | |
|---|---|---|
| 3,657,786 A | 4/1972 | Wiswell, Jr. |
| 3,829,992 A | 8/1974 | Reid et al. |
| 3,989,150 A | 11/1976 | Stephenson et al. |
| 4,130,204 A | 12/1978 | Pickard |
| 4,166,544 A | 9/1979 | Cecchi et al. |
| 4,362,435 A | 12/1982 | Henry |
| 5,368,124 A | 11/1994 | Fukutomi |
| 5,480,201 A | 1/1996 | Mercer |
| 5,845,739 A | 12/1998 | Ohtsuki |
| 6,105,699 A | 8/2000 | Hinds |
| 6,173,973 B1 | 1/2001 | Robinson |
| 6,280,119 B1 | 8/2001 | Ryan et al. |
| 6,540,095 B2 | 4/2003 | Haringer |
| 6,893,189 B2 | 5/2005 | Matsushita et al. |
| 7,261,493 B2 | 8/2007 | Wilkinson |
| 7,832,740 B2 | 11/2010 | Kim et al. |
| 8,069,592 B2 | 12/2011 | Ellett |
| 9,346,498 B2 | 5/2016 | Throop |
| 10,220,921 B1 * | 3/2019 | McConnell ............. B63B 35/03 |
| 2004/0190995 A1 | 9/2004 | Matsushita et al. |
| 2005/0117973 A1 | 6/2005 | Nelson |
| 2009/0297275 A1 | 12/2009 | Davis |
| 2010/0180475 A1 | 7/2010 | Ellett |
| 2011/0221215 A1 | 9/2011 | Botwright |
| 2013/0051921 A1 | 2/2013 | Chiodini |
| 2013/0121769 A1 | 5/2013 | Gately |
| 2013/0283589 A1 | 10/2013 | Lavalley et al. |
| 2014/0037411 A1 | 2/2014 | McConnell |
| 2014/0252285 A1 | 9/2014 | Genoe |

FOREIGN PATENT DOCUMENTS

| | | |
|---|---|---|
| CN | 2723413 | 9/2005 |
| CN | 201496651 | 6/2010 |
| CN | 102976200 | 3/2013 |
| DE | 1246200 | 8/1967 |
| EP | 0048307 | 3/1982 |
| EP | 1265017 B1 | 9/2007 |
| FR | 2445291 | 7/1980 |
| JP | 6173289 | 6/1994 |
| JP | 10297868 | 11/1998 |
| KR | 20140139256 | 12/2014 |
| WO | 2012054961 | 5/2012 |
| WO | 2014133400 | 9/2014 |

OTHER PUBLICATIONS

PCT/US18/50557 Written Opinion of the International Searching Authority: dated Jan. 28, 2019.

Komatsu America Corp., FPSB 1026-02, Model No. XT460L-3, advertisement published Aug. 12, 2015.

* cited by examiner

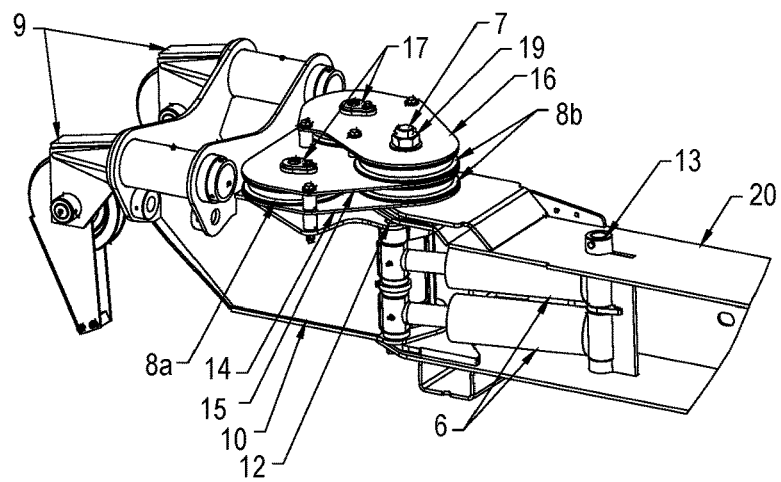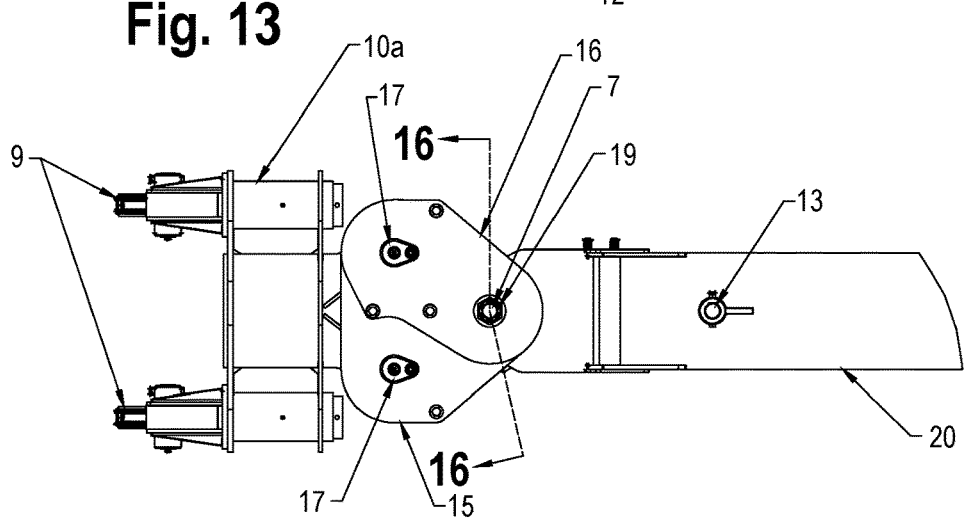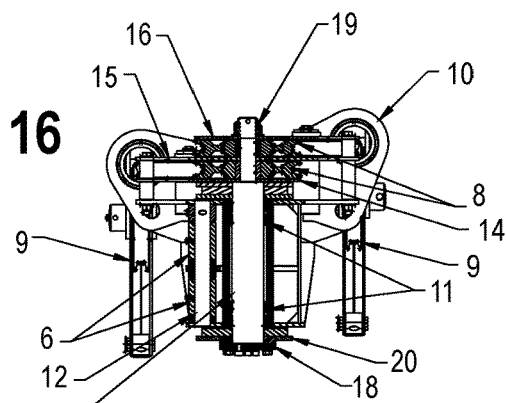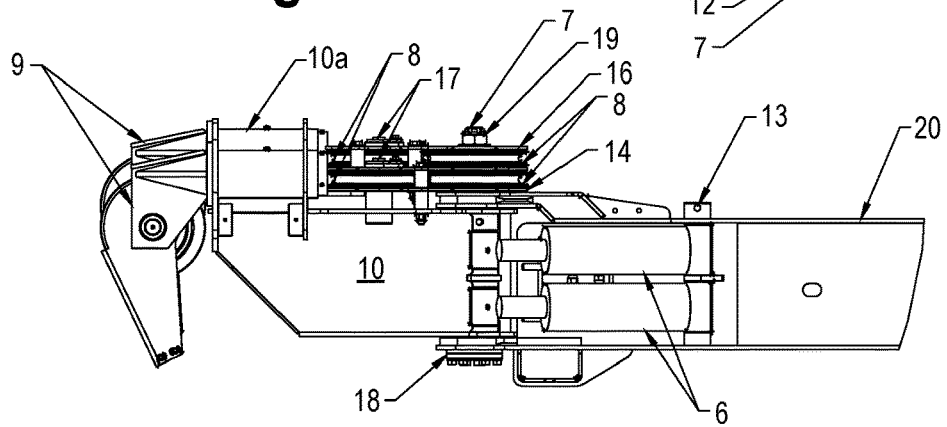

PIPE-LAYING VEHICLE WITH ROTATOR PLATFORM LEVELING SYSTEM

BACKGROUND OF THE INVENTION

The present invention generally relates to vehicles for laying pipe on uneven or sloped terrain.

A conventional pipeline construction method used in steep mountain terrain is as follows. First, a route is chosen with environmental impact considerations and land acquisitions. The land is cleared and profiled. When the routing of pipeline is up or down a substantial grade such as mountains, the pipeline will run as near perpendicular to grade as possible. This minimizes the possibility of the pipeline being damaged if there is any movement in the ground. An excavator anchored to a bulldozer is used to dig trenches up the steep slopes. The bulldozer winch cable connected to the excavator holds the excavator in position for digging. When the excavator needs repositioning, the bulldozer winch is used to help the excavator climb the grade. Multiple bulldozers may be anchored together if the slope is too long for the length of winch cable on one bulldozer. Pipe sections are then positioned in the trench using a sidewinder bulldozer. The same process used for anchoring excavators on steep grades is used with the sidewinder pipe layers. Only one pipe section can moved up the grade at a time. Once a pipe section is positioned in the trench, the sidewinder must travel back to the bottom of the grade to get the next section. To match the pipe sections to the shape of terrain, they are formed on sight. All pipe sections are coated with a special anticorrosion coating. The coating must be protected from damage. Areas at the ends of the pipe sections near the weld joint are not coated with the protective coating. These areas are coated after the weld and inspection processes are completed. Pipe sections are positioned in the trench on sand bags. The trench is enlarged around the pipe joints to allow access for welding and inspection. Hydrostatic testing is performed after all weld joints have been certified. The trench is backfilled, leveled and seeded once the pipeline has been approved.

Another known prior art method is to employ tree-harvesting vehicles with a platform leveling system. A number of manufacturers (e.g., Komatsu, Cat, John Deere, Tiger Cat, and Timber Pro) build equipment known as Feller Bunchers, with leveling systems, used for harvesting trees. Study of this equipment shows that the maximum tilt angle from front-to-back for these systems is about 20°28° (TimberPro) forward, and less than 10° to the back. This equipment can also tilt side-to-side up from 11° up to 20° (TimberPro). Maintaining a level platform when rotating the load is important, because otherwise the vehicle can tip in a dangerous manner This is especially true when attempting to lay pipe on terrain sloped more than 25° and up to 45°-50°.

Accordingly, there is a need for providing a pipe-laying vehicle having a leveling system, and providing a front-to-back tilt angle, preferably substantially greater than 20-28° forward, such as up to about 45°-50° forward, and up to 5° to the back, and up to 15° to either side.

An angled boom head, i.e., the ability to angle or tilt a boom head having lift cables running through it, would be advantageous for the reasons now provided. Pipe-laying experience in the field shows that it is desirable to use two cables to lift and position the pipe, and to be able to position two different pipe lengths from one location. Using two cables eliminates the need to manually force the pipe to match the grade of the trench. Based on experience with booms and using two cables to lift a load, the load will position itself perpendicular to the centerline of the boom. Depending on the size of the load and the length of the cables, it is sometimes impossible to force a load into a position that is angled to the boom. This creates a significant design challenge, which was solved with the present invention by using a common center for the pivot of the angle boom and the lift cable transfer sheaves. By using the common pivot, there will be little change in the hook height when the angle is changed to aligned the load with the trench. Feller Bunchers do not have an angled boom head.

Other prior art located in a search and cited here shows some ability to angle a boom head, or some ability to level a rotating platform, but no known vehicle combines both functions in the manner of the present invention.

Accordingly, there is a need for a vehicle for laying pipe on hilly or mountainous terrain as described above.

SUMMARY OF THE INVENTION

The objects mentioned above, as well as other objects, are solved by the present invention, which overcomes disadvantages of prior pipe-laying vehicles, while providing new advantages not previously associated with them. This summary is provided to introduce a selection of concepts in a simplified form that are further described below in the Detailed Description, so that the claimed invention may be better understood. However, this summary is not intended to identify key features of the claimed subject matter, and is not intended to limit the scope of the claimed subject matter.

In general, a pipe-laying vehicle is provided with: (1) a rotator platform leveling system, capable of providing side-to-side and/or front-to-back platform leveling; and (2) an angled boom head, which allows two winch cables to support a pipe on each end, such that by rotating the boom head, the pipe section can be angled to match the offset angle of the trench.

In one preferred embodiment of the present invention, a self-propelled vehicle is used to lay pipe sections within trenches located on sloped terrain. The pipe-laying vehicle includes: an undercarriage, which may but need not be tracked, supporting a vehicle chassis and capable of climbing the sloped terrain; a rotating platform mounted on the vehicle chassis; and a boom carried by the rotating platform, with an angled boom head capable of using two independent winch cables to lift and position individual pipe sections having differing lengths. The vehicle is useable to sequentially lift two or more pipe sections, one at a time, and to swing and position the pipe sections in a trench, end-to-end.

Preferably, the rotating platform has a leveling function enabling the platform to be maintained in a level, horizontal plane relative to the sloped terrain, during the work function of the vehicle.

The vehicle may be used to lift and swing two or more pipe sections, one at a time, into position in a trench, end-to-end, without any need to relocate the vehicle.

Preferably, a pivot of the angled boom, and a pivot of the two winch cables, share a common center point, thereby enabling an insubstantial change in hook height when the tilt angle of the boom head is changed to align a pipe section with the trench.

In one preferred embodiment, the angled boom head is capable of a tilt angle of between about 50°-59°.

Preferably, the platform is capable of continuous 360° rotation. In less preferred embodiment, the platform may not be capable of such continuous rotation.

In another preferred embodiment, the vehicle is capable of moving along grades, with a substantially level platform, of substantially greater than 20°-28°, up to 45°-50°, front-to-back (although assistance may be required on steeper grades), up to 5° to the back, and up to 15° side-to-side. An engine may be, but need not be, mounted to the platform. For safety and convenience, it is preferred that all principal functions of the vehicles are capable of being controlled remotely.

In yet another embodiment, the boom may have an extended capacity of at least 20,000 pounds at a 30° boom angle. The boom may be capable of a maximum boom angle of 60°. The vehicle may be designed, for example, to trench-lay pipe sections up to 42-inches OD and up to 40-feet long. The platform may, but need not, incorporate an extendible counterweight.

Dual 35,000-pound winches may be used. Stabilizer winches may be mounted to the front and rear of the undercarriage. An uphill winch may be used to facilitate the vehicle climbing up steep grades. A downhill winch may be used to pull a pipe cart up-grade, and to deliver additional pipe sections.

A method for using a self-propelled vehicle to lay pipe sections within trenches located on sloped terrain, also forms a part of the claimed invention. The vehicle has an undercarriage capable of climbing the sloped terrain, a vehicle chassis supporting a rotating platform, and a boom with an angled boom head, carried by the rotating platform. While maintaining the rotating platform in a substantially level, horizontal plane relative to the sloped terrain, the boom and the angled boom head may be used to manipulate two independent winch cables in order to lift and position individual pipe sections having differing lengths, such that the vehicle is useable to sequentially lift two or more pipe sections, one at a time, and to swing and position the pipe sections in a trench, end-to-end.

DEFINITION OF CLAIM TERMS

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"Tilt angle of boom head" means the angle of offset between the boom head and the centerline of the boom, as illustrated by angle β in FIGS. 6 and 7.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 13-15 are top, and top-and-side perspective views of the extendable boom third stage and angle boom in the preferred embodiment;

FIG. 16 is a sectional view along section line 16-16 of FIG. 13;

The components in the drawings are not necessarily to scale, emphasis instead being placed upon clearly illustrating the principles of the present invention. In the drawings, like reference numerals designate corresponding parts throughout the several views.

Figure 1:
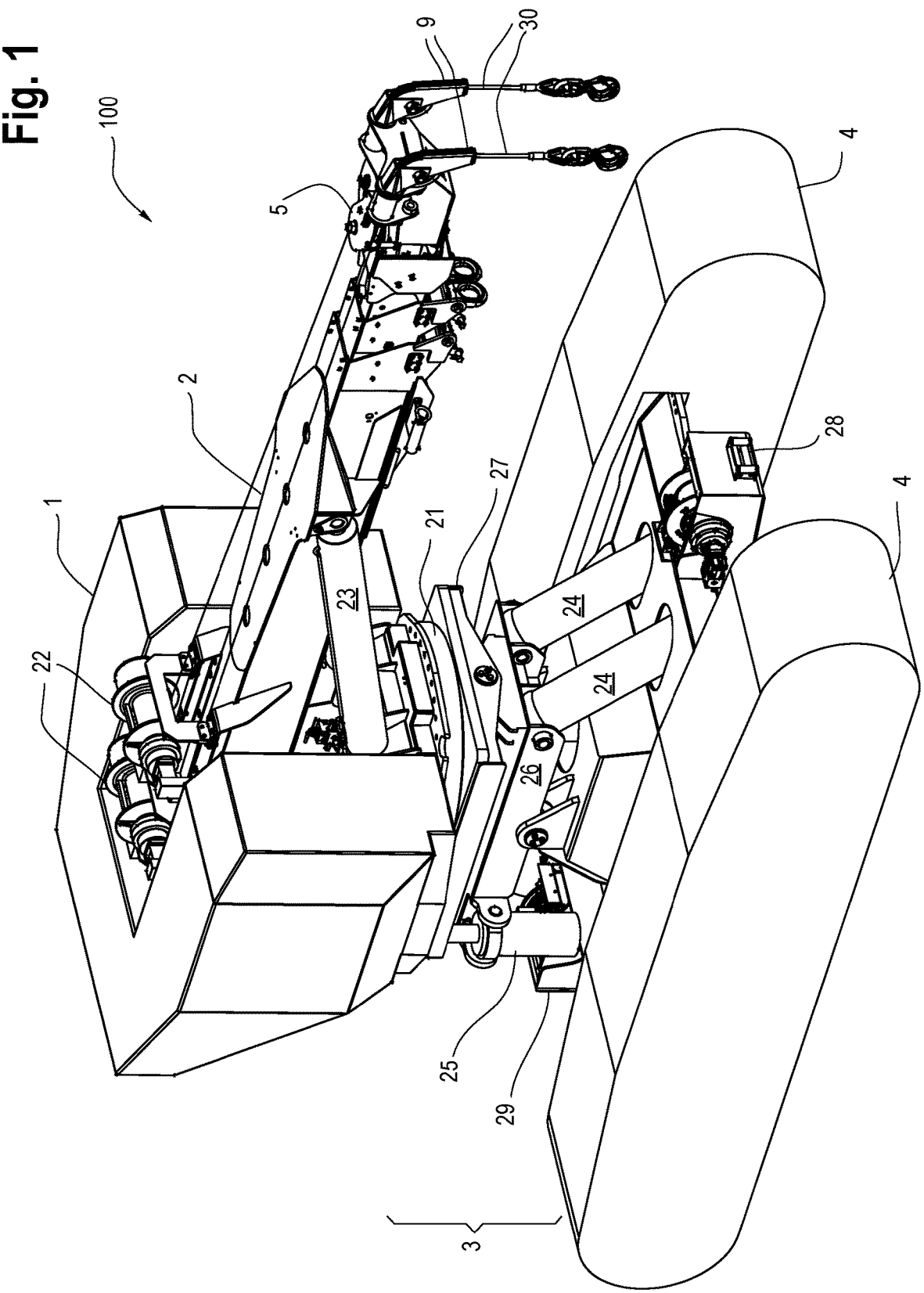
FIG. 1 is a top and side perspective view of a pipe-laying vehicle according to a preferred embodiment of the present invention.
Figure 2:
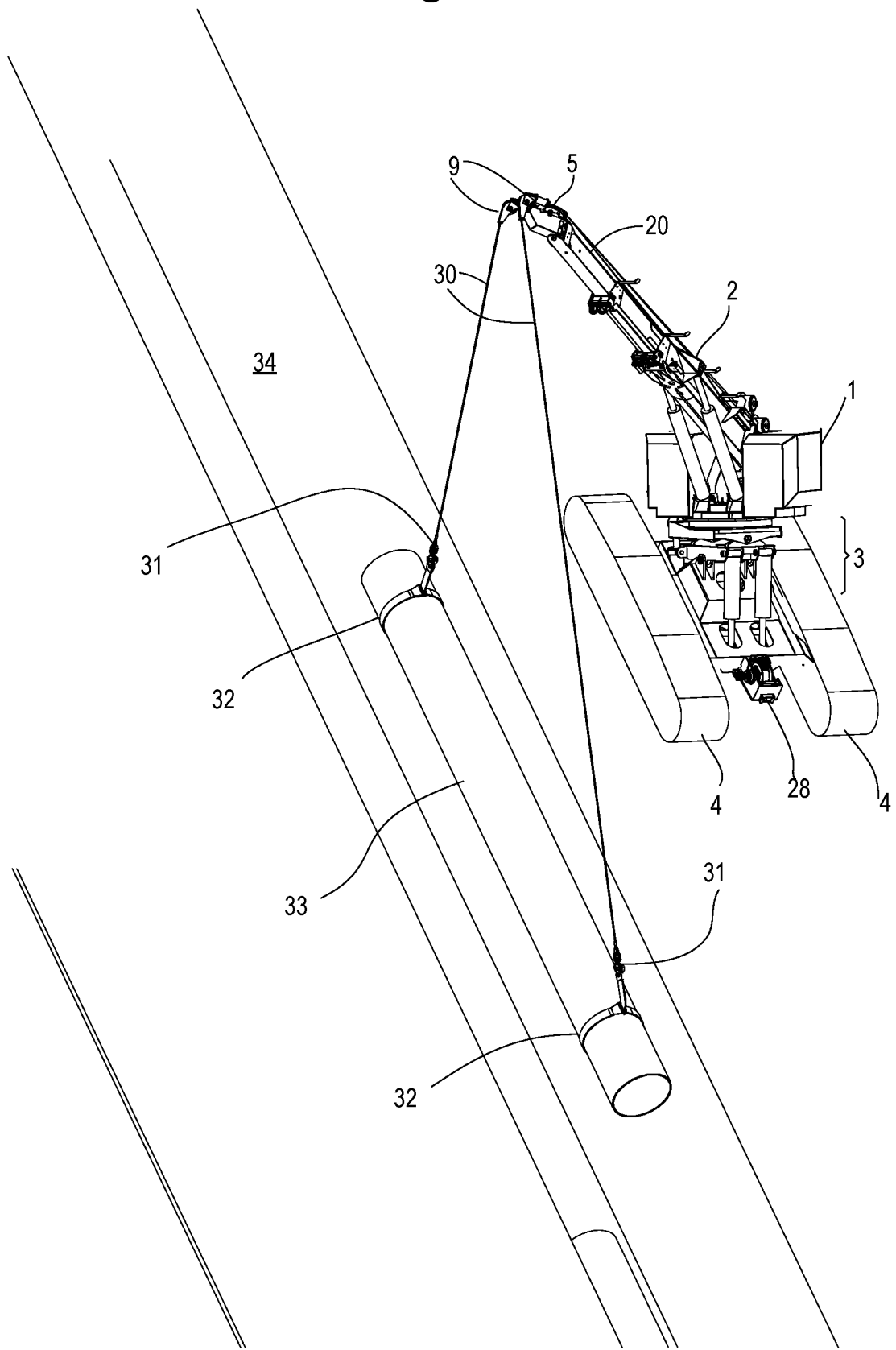
FIG. 2 is a top and side perspective view of the vehicle shown in FIG. 1, in the act of laying a pipe on sloped terrain.
Figure 3:
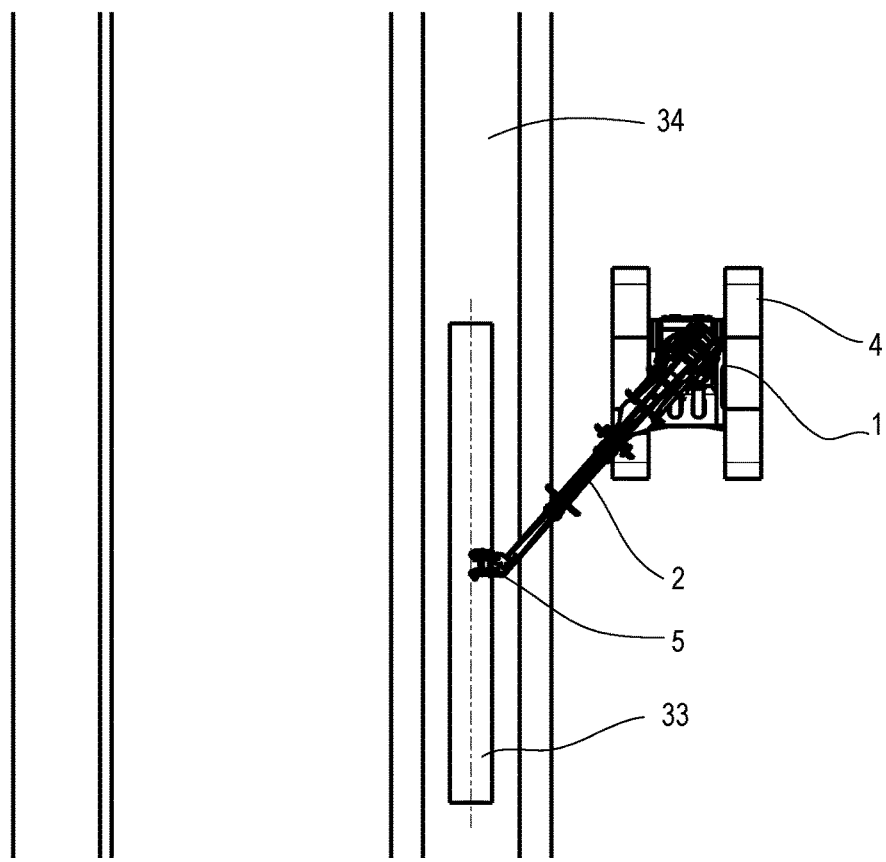
FIGS. 3 and 4 are top (aerial) and side views of the vehicle shown in FIG. 2.
Figure 4:
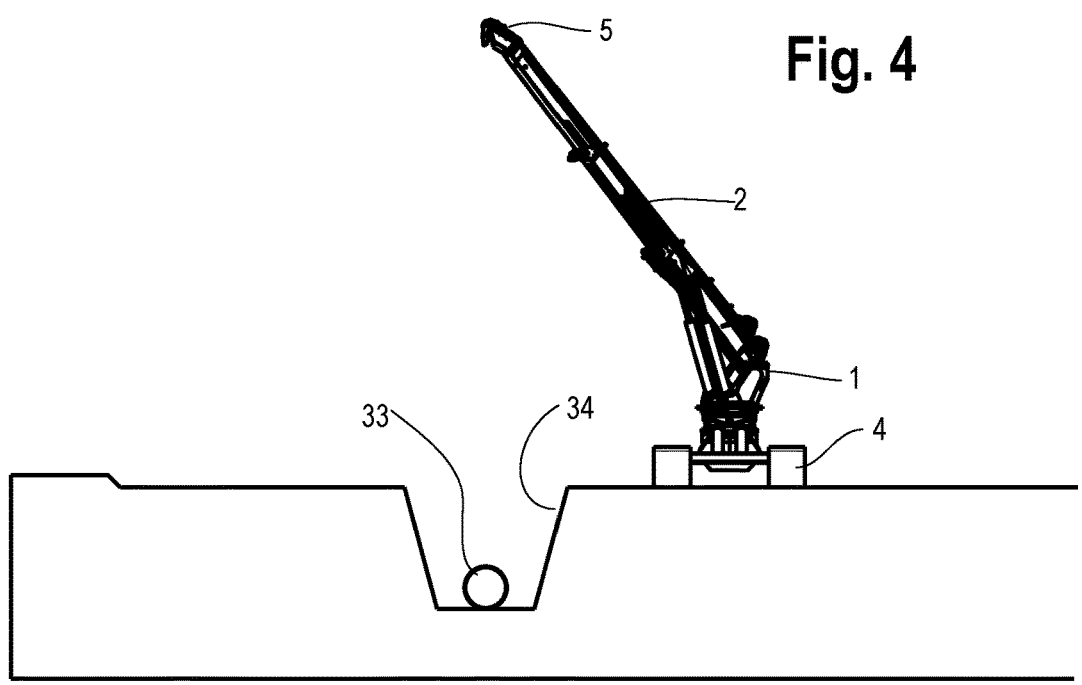
Figure 5:
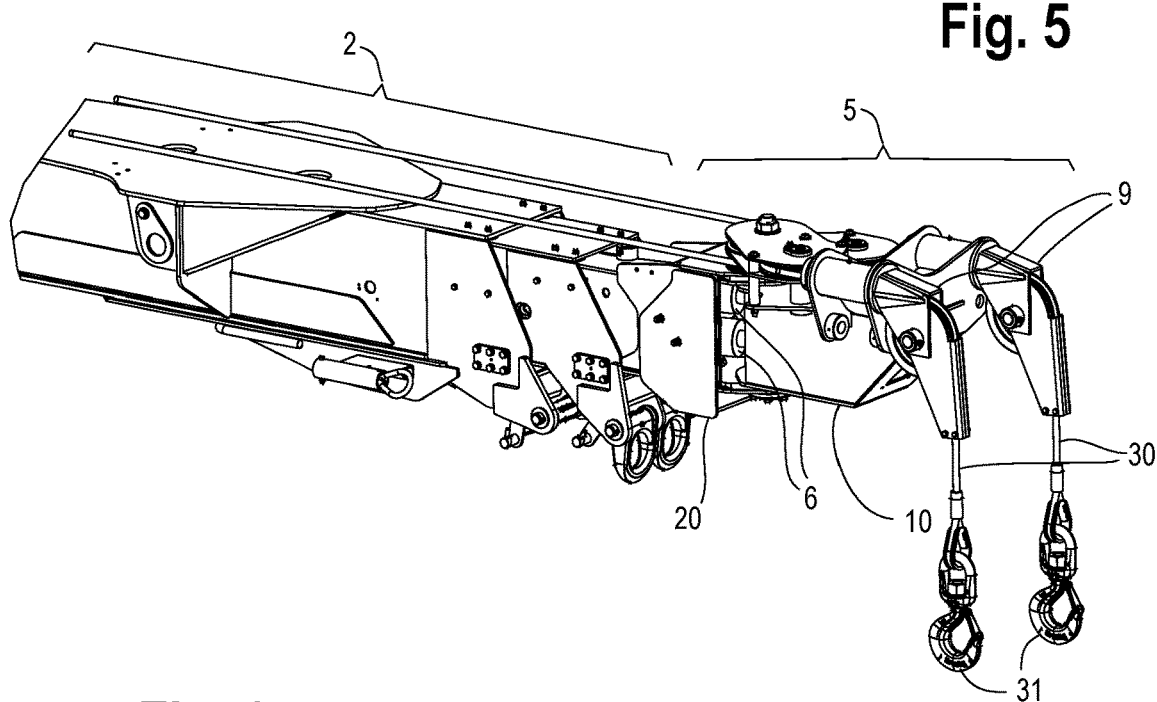
FIG. 5 is an enlarged, perspective view of the boom of the vehicle shown in the above drawings.
Figure 6:
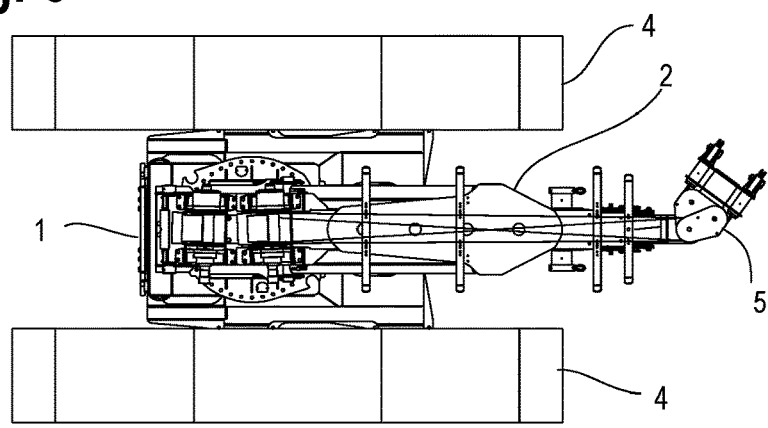
FIGS. 6 and 7 are top (aerial) views of the vehicle illustrating the ability of the boom head to rotate in a horizontal plane.
Figure 7:
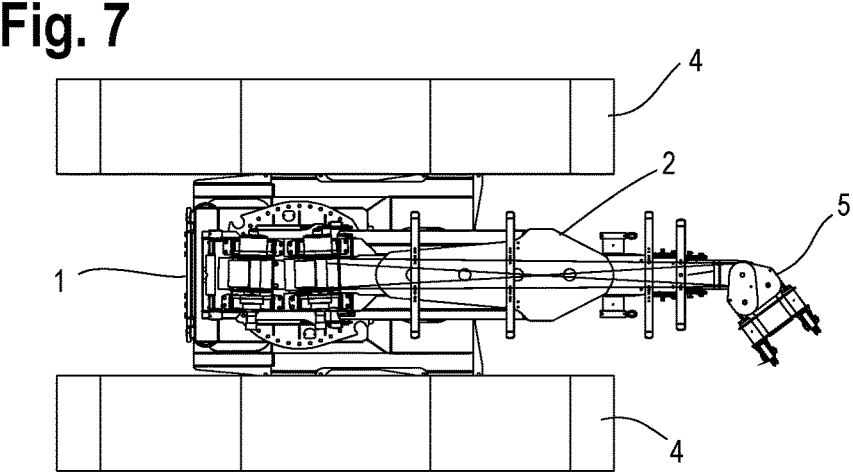
Figure 8:
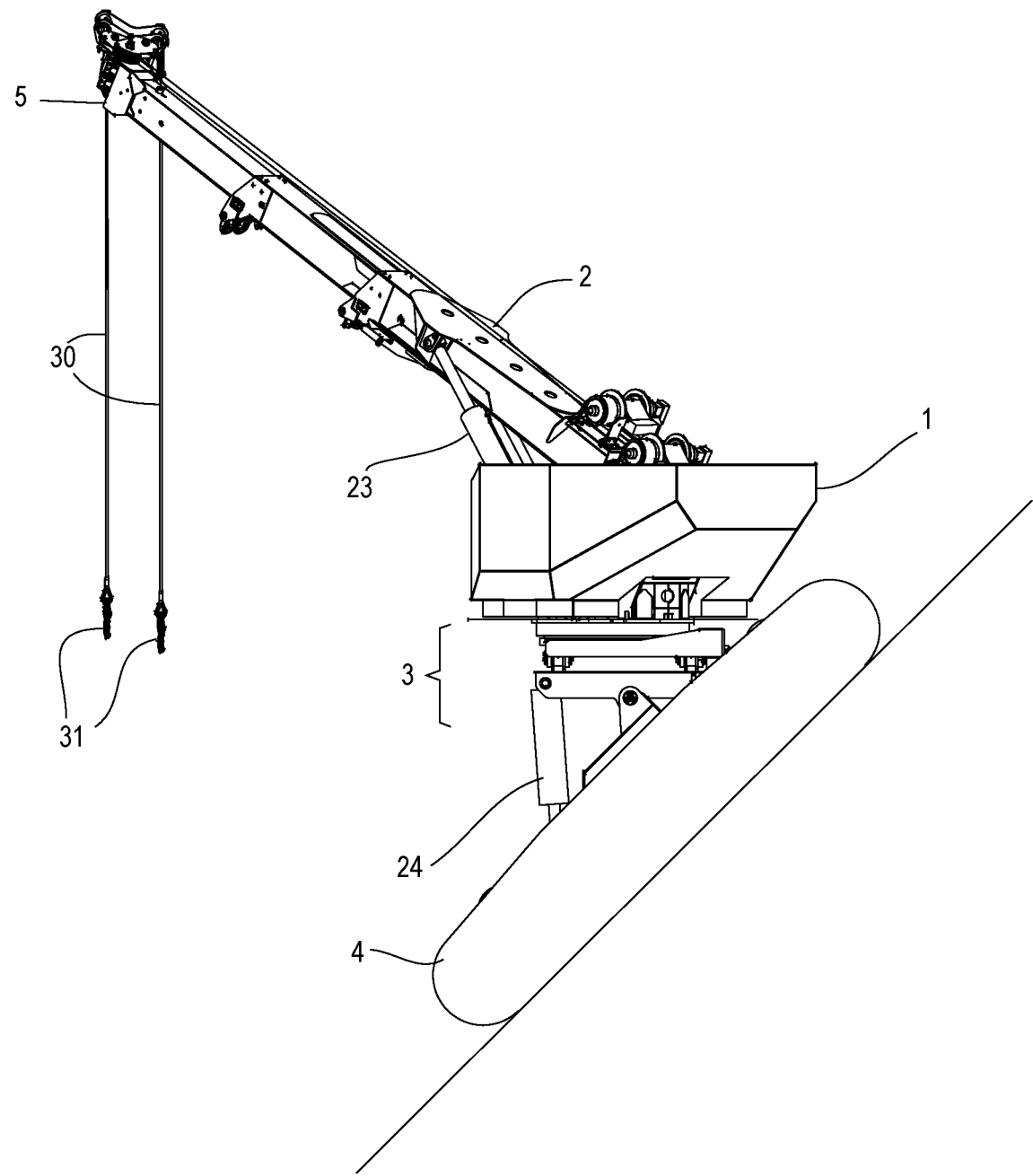
FIGS. 8-10 are side perspective views illustrating the platform leveling ability of the preferred embodiment.
Figure 9:
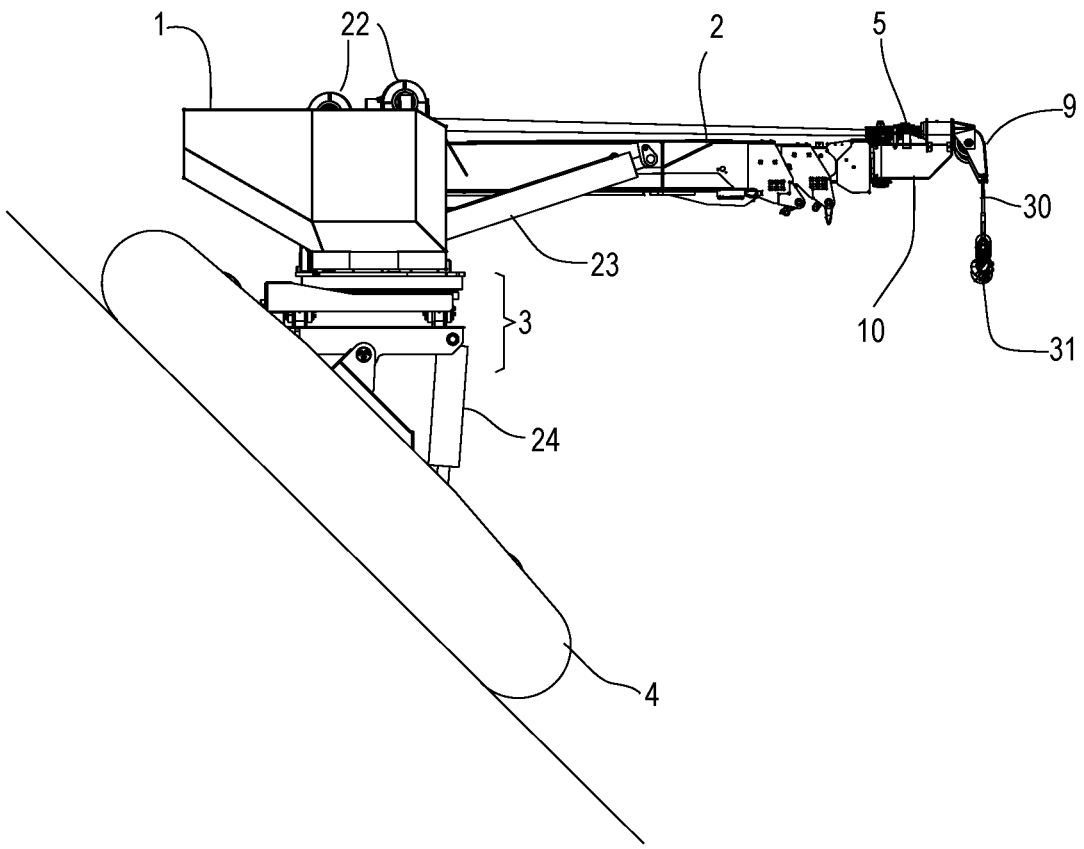
Figure 10:
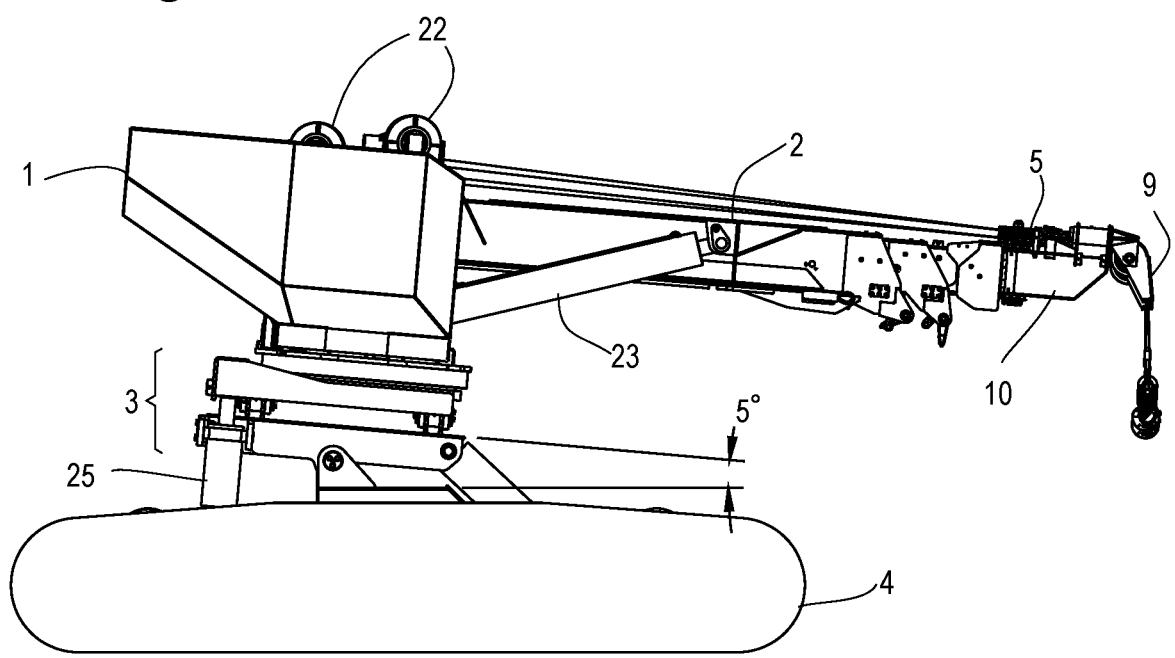
Figure 11:
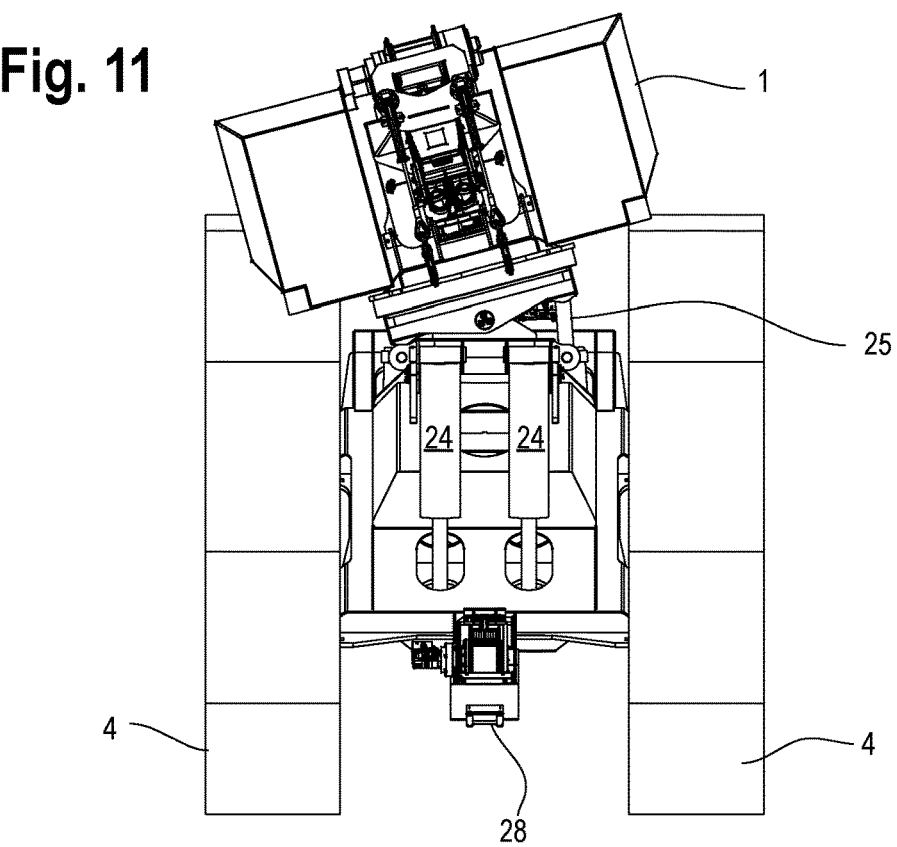
FIG. 11 is a view from the right side of FIG. 9, showing the side tilt at the maximum angle.
Figure 12:
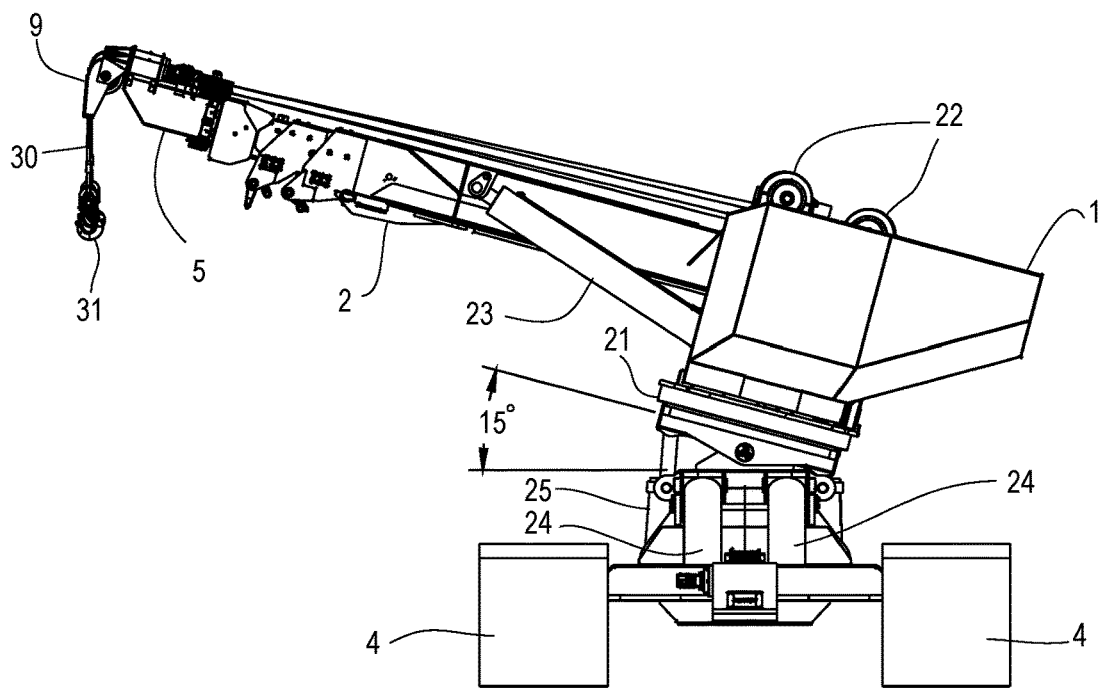
FIG. 12 is a front view of the preferred embodiment shown in FIG. 1, showing the side tilt at a proposed maximum angle.
Figure 17:
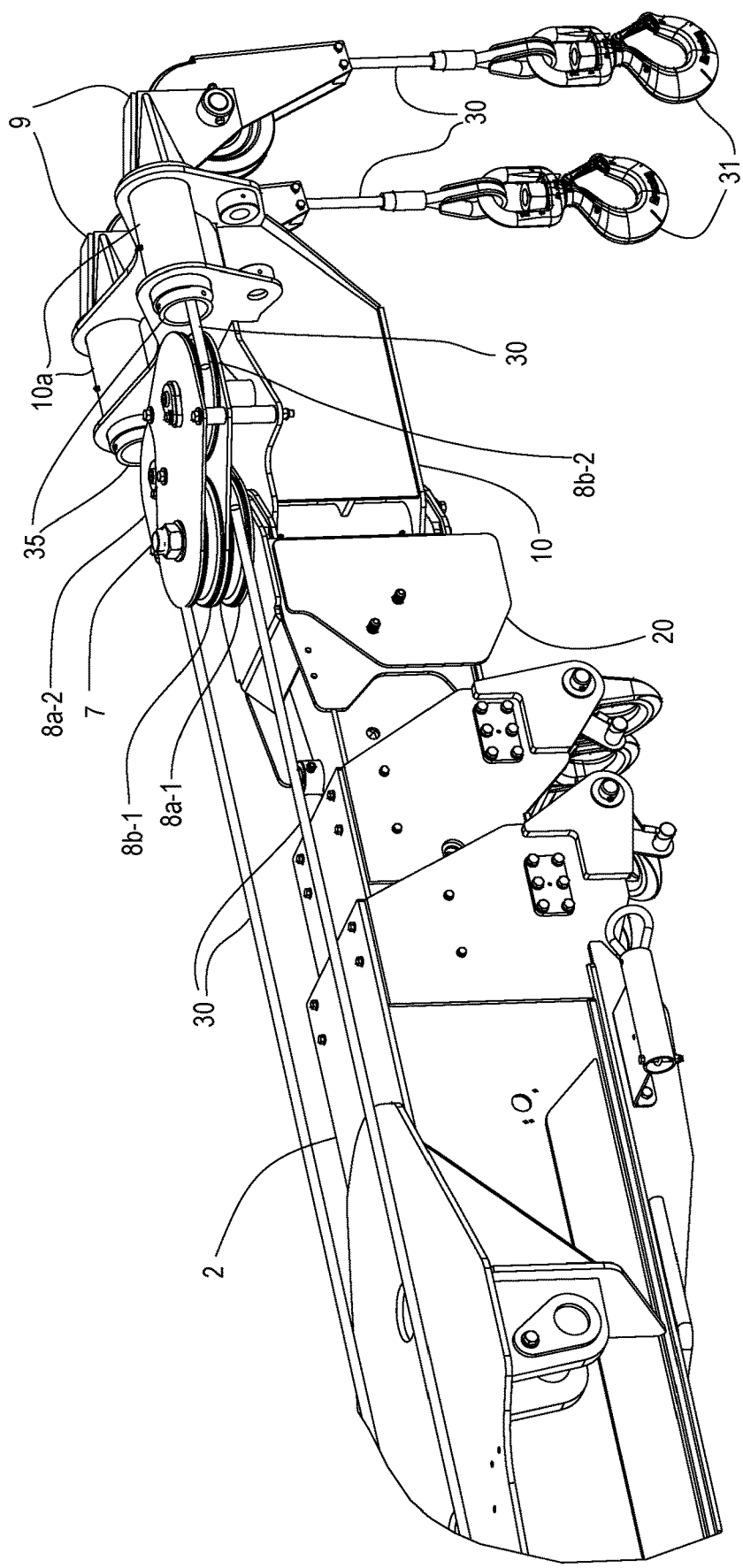
FIG. 17 is a partial side and top perspective view of the end of the extendable boom assembly, in the preferred embodiment.
Figure 18:
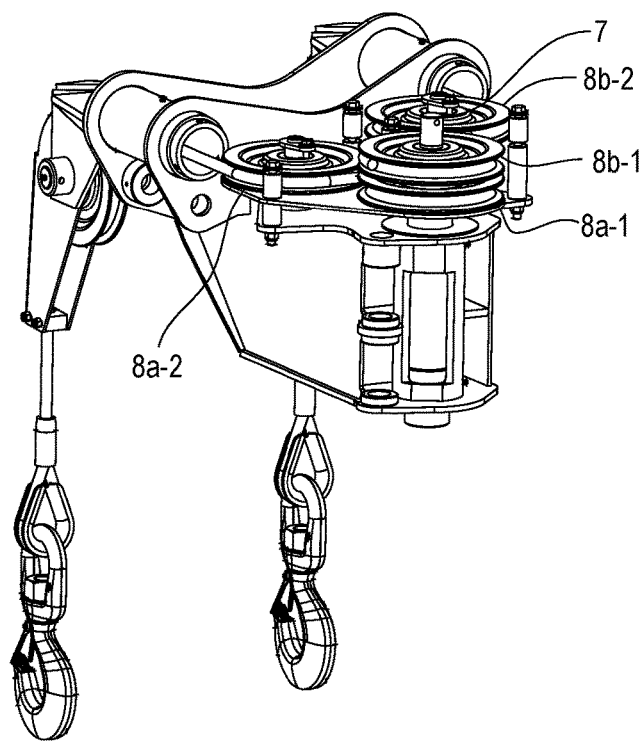
FIG. 18 is a partial perspective view of the end of the extendable boom assembly, with the redirection sheave mounting plates hidden for clarity (compare with FIGS. 14 and 19)

The following parts list is provided for convenience in reading the following description of the preferred embodiment, in conjunction with the drawings. This parts list is not intended to limit the claimed invention in any way, as persons of ordinary skill will readily understand and appreciate that the claimed invention may still be effectuated using different, additional or omitted parts.

| Reference Numeral | Description |
| --- | --- |
| 1 | upper rotator frame assembly |
| 2 | extendable boom assembly |
| 3 | tilt frame assembly |
| 4 | crawler frame assembly |
| 5 | angle boom assembly |
| 6 | angle boom cylinder |
| 7 | angle boom pivot shaft |
| 8a | lower redirection sheaves |
| 8b | upper redirection sheaves |
| 9 | sheave head assembly |
| 10 | angle boom |
| 10a | angle boom cylinder portion |
| 11 | angle boom pivot bushings |
| 12 | angle boom cylinder rod shaft |
| 13 | angle boom cylinder base shaft |
| 14 | redirection sheave bottom mounting plate |
| 15 | redirection sheave center mounting plate |
| 16 | redirection sheave top mounting plate |
| 17 | redirection sheave pivot shaft |
| 18 | angle boom pivot shaft retainer plate |
| 19 | angle boom pivot shaft retainer nut |
| 20 | extendable boom third stage |
| 21 | rotation bearing |
| 22 | boom winch |
| 23 | boom lift cylinder |
| 24 | rotator platform leveling cylinder |
| 25 | rotator platform side leveling cylinder |
| 26 | leveling frame |

-continued

| Reference Numeral | Description |
| --- | --- |
| 27 | rotator platform |
| 28 | front stabilizer winch |
| 29 | rear stabilizer winch |
| 30 | winch cable |
| 31 | winch cable hook |
| 32 | lifting sling |
| 33 | pipe section |
| 34 | trench |
| 35 | sheave head pivot tube |
| 36 | extendable boom outer stage |
| 37 | extendable boom second stage |
| 38 | crawler frame |
| 39 | rotator platform leveling cylinder shaft |
| 40 | rotator platform leveling pivot shaft |
| 41 | rotator platform side leveling cylinder shaft |
| 42 | rotator platform side leveling pivot shaft |
| 43 | rotator platform side leveling cylinder pivot plate |

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Referring now to FIG. 1, a preferred embodiment of the present invention, a pipe-laying vehicle, is shown and designated generally with the reference numeral 100. Pipe-laying vehicle 100 may include an upper rotator frame assembly 1 carrying an extendible boom assembly 2, a tilt frame assembly 3 supporting upper rotator frame assembly 1, and a crawler frame assembly 4 to support and propel vehicle 100.

Figure 19:
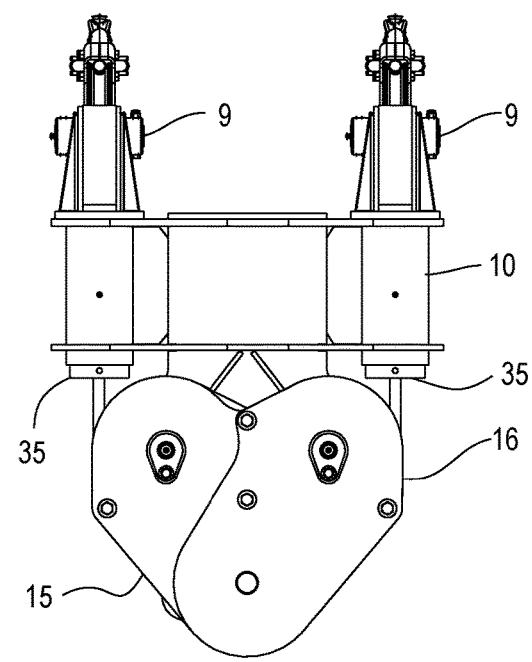
FIG. 19 is a top perspective view of FIG. 18.
Figure 20:
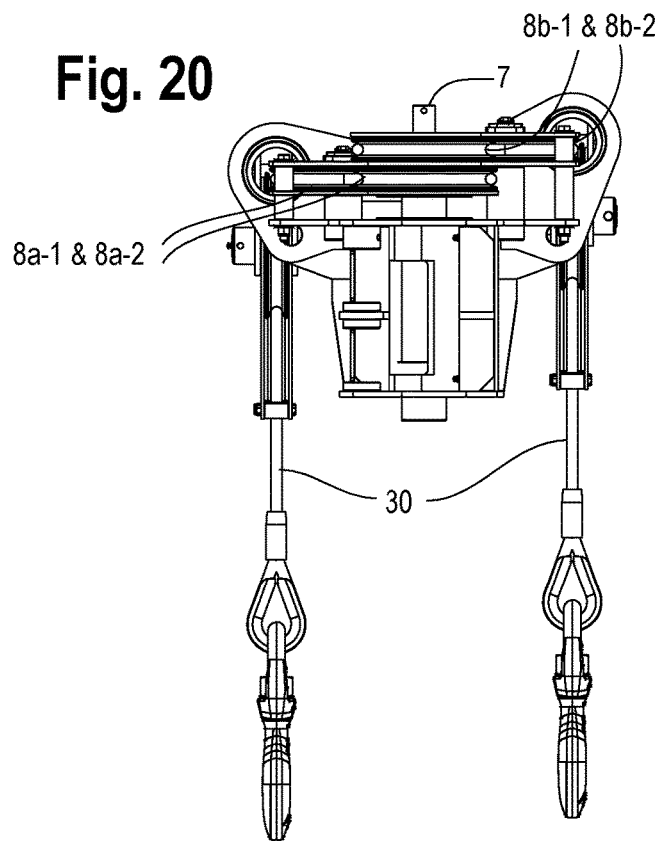
FIG. 20 is a front view of FIG. 18.

Referring to FIGS. 1, 13-16 and 21, extendable boom assembly 2 may include boom winches 22, winch cables 30, extendable boom outer stage 36, extendable boom second stage 37 and extendable boom third stage 20. Angle boom assembly 5 may be attached to extendable boom third stage 20, and may include the parts assembled as shown in FIGS. 1, 13-16 and 21, including angle boom cylinder 6, angle boom pivot shaft 7, redirection sheave 8 and sheave head assembly 9 (standard wrecker sheave head assemblies, currently available from Miller Industries Towing Equipment Inc., for example, which allow the winch cables to align with the load). Angle boom 10 is the weldment of the angle boom, and includes angle boom pivot bushings 11, angle boom cylinder rod shaft 12 (the pivot shaft that attaches angle boom cylinders 6 to angle boom 10), and angle boom cylinder base shaft 13 (the pivot shaft that attaches angle boom cylinders 6 to extendable boom third stage 20). Angle boom cylindrical portions 10*a* are part of angle boom 10 (see, e.g., FIGS. 13, 15 and 19).

Referring to FIGS. 17-20, angle boom assembly 5 includes redirection sheave bottom mounting plate 14, redirection sheave center mounting plate 15 and redirection sheave top mounting plate 16, which together hold redirection sheaves 8 in place. The two lower redirection sheaves 8*a* redirect one winch cable to right sheave head assembly 9. The two upper redirection sheaves 8*b* redirect the other winch cable to left sheave head assembly 9. The first set of redirection sheaves 8*a*-1, 8*b*-1, pivot on angle boom pivot shaft 7 so there is a common pivot point for the angle boom and sheaves. The second set of redirection sheaves 8*a*-2, 8*b*-2, turn the winch cables running through sheave head pivot tubes 35 (carried by angle boom cylinder portions 10*a*) to sheave head assembly 9.

Figure 21:
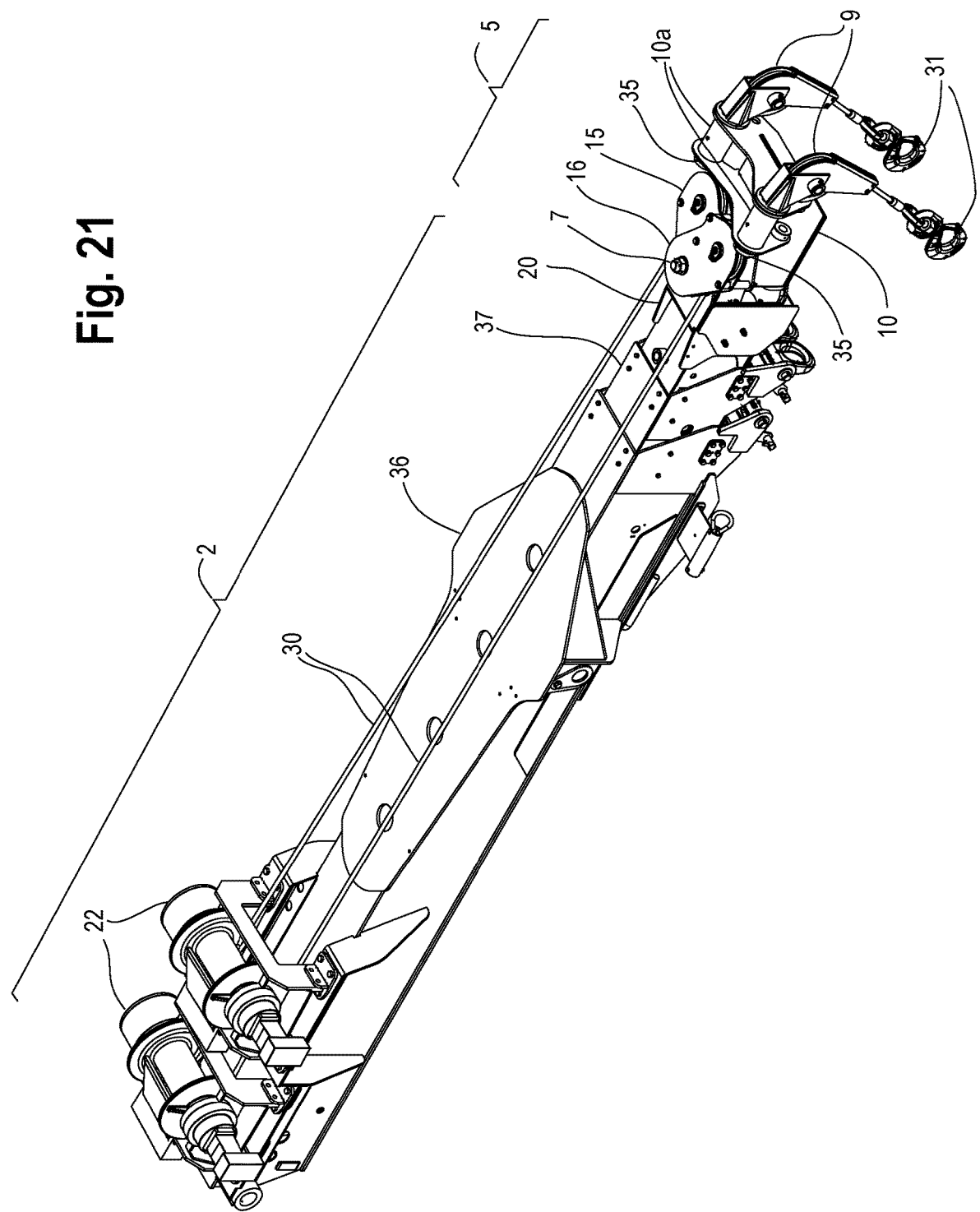
FIG. 21 is a perspective view of the extendable boom assembly and the angle boom assembly, in the preferred embodiment.

Referring to FIGS. 5 and 13-16, extendable boom third stage 20 is the inner-most boom stage of extendable boom assembly 2, and is the stage that angle boom pivot shaft 7 and angle boom assembly 5 mount to. Dual boom winches 22 may be carried on a top portion of extendable boom assembly 2, to spool winch cables 30 along angle boom assembly 5, terminating in dual winch hooks 31. Boom lift cylinder 23 provides the motive force to lift extendable boom assembly 2. Referring to FIG. 21, extendable boom outer stage 36 is the weldment that boom winches 22 mount to.

Referring to FIGS. 13-16, angle boom pivot shaft retainer plate 18 connects angle boom pivot shaft 7 to extendable boom third stage 20. Retainer nut 19 holds redirection sheaves 8 and redirection plates 14, 15, 16 in place.

Figure 22:
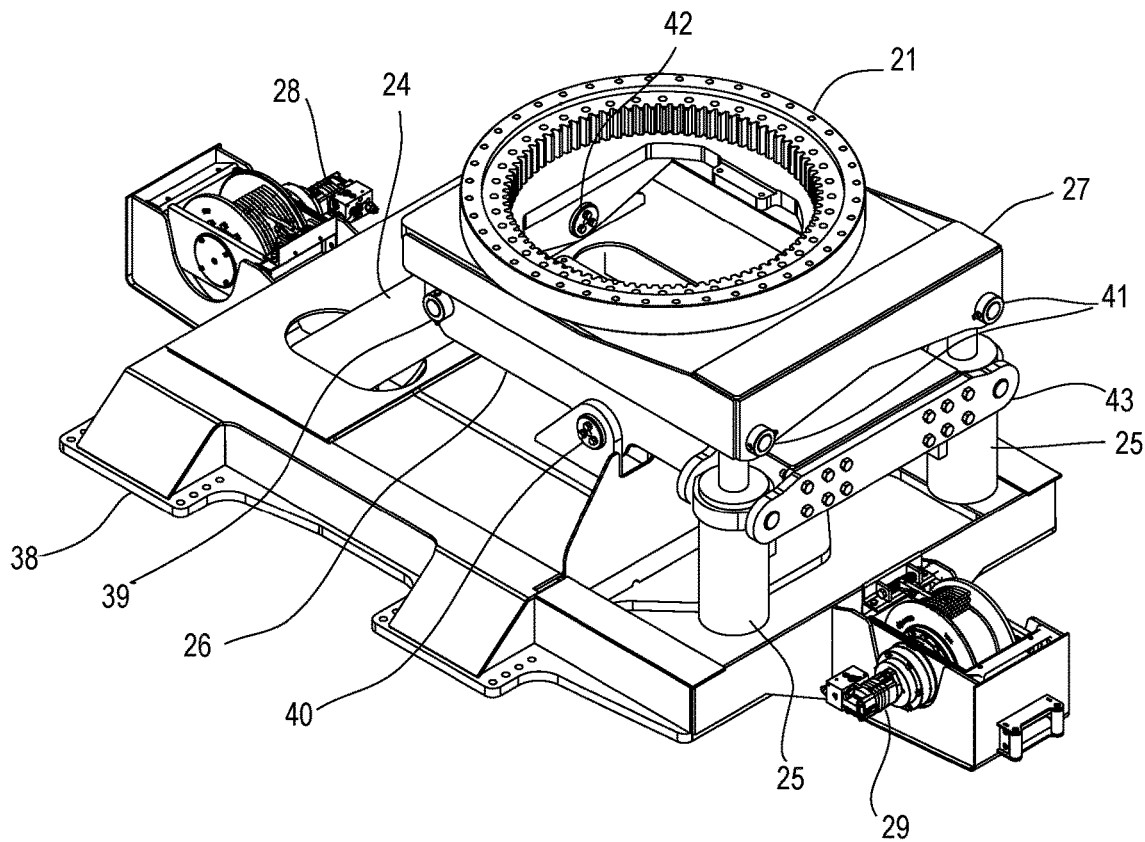
FIG. 22 is a partial, cut-away, side and top perspective view of the tilt frame assembly.
Figure 23:
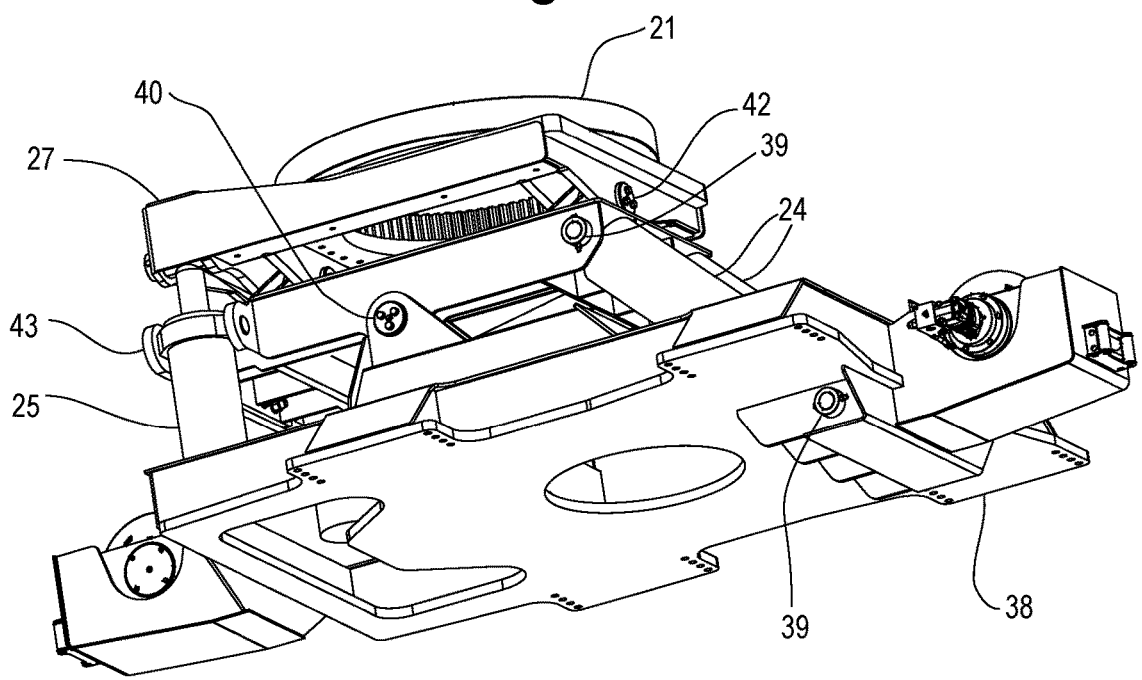
FIG. 23 is a side and bottom perspective view of the tilt frame assembly shown in FIG. 22.

Referring to FIGS. 1 and 22-23, tilt frame assembly 3 includes leveling frame 26 and rotator platform 27, supported by crawler frame 38. As shown in FIGS. 8-12, tilt frame assembly 3 may be selectively tilted by rotator platform leveling cylinders 24 and rotator platform side leveling cylinders 25. Rotator platform leveling cylinder shaft 39 attaches the rotator platform leveling cylinders 24 between the crawler frame 38 and the leveling frame 26. Rotator platform leveling pivot shaft 40 attaches the leveling frame 26 to the crawler frame 38 (the shaft the leveling frame 26 pivots on). Rotator platform side leveling cylinder shaft 41 attaches the rotator platform side leveling cylinders 25 to the rotator platform 27. Rotator platform side leveling pivot shaft 42 attaches the rotator platform 27 to the leveling frame 26 (the shaft the rotator platform pivots on). Rotator platform side leveling cylinder pivot plate 43 attaches the rotator platform side leveling cylinders 25 to the leveling frame 26.

Rotation bearing 21 allows upper rotator frame assembly 1 to rotate relative to tilt frame assembly 3.

Referring to FIG. 1, front stabilizer winch 29 may be used to secure vehicle 100 to support vehicles or fixed objects located above vehicle 100 on a steep hill, to secure vehicle 100. Rear stabilizer winch 28 (see FIGS. 1 and 11) may be used to pull a pipe cart up-grade, for example, to deliver additional pipe sections.

It will now be appreciated by those of ordinary skill in the art that pipe-laying vehicle 100 which forms a preferred embodiment of the present invention, can be provided with one or more of the following capabilities, as desired:

1. Use of two independent winch cables for lifting and positioning pipe sections up to 42-inches diameter by 40-feet long.

2. Continuous 360 degrees rotation is preferred, but not necessary.

3. Self-propelled tracked undercarriage capable of climbing grades.

4. Engine mounted in the upper rotating assembly.

5. For operator safety and visibility, all functions are preferably remote-controlled.

6. Capable of operating with the platform at a substantially level condition relative to horizontal on grades up to 45°-50° front-to-back, up to 5° to back, and ±15° side-to-side.

7. Upper rotator assembly has the ability to be leveled to the slope, providing a horizontal plane of rotation.

8. Desired maximum working radius may be, e.g., 30 feet.

9. Boom may be capable of, e.g., a 60° maximum boom angle.

10. Dual, e.g., 35,000-pound winches.

11. Boom may have an extended capacity of, e.g., 20,000-pounds at a 30 degrees boom angle.

12. Unit may be capable of lifting, e.g., two 40-foot pipe sections, one at a time, from a location at its centerline of travel, and then swinging and positioning them in a trench, end-to-end, with minimum relocation. Because the pipe can be rotated by the unit, the pipe can be located anywhere within its 180° swing, i.e., anywhere from the side next to the trench, all the way around to the opposite side from the trench (as long as the load is within the capacity of the radius). A normal working radius to the trench may be, e.g., between 15-20 feet.

13. For aligning the pipe parallel with the trench, the boom head is preferably designed so that it can be offset in angle to the centerline of the boom.

14. The boom head is preferably designed so angle function has little effect on the hook height.

15. Stabilizer winches may be mounted to the front and rear of the undercarriage.

16. An uphill winch is preferably used for anchoring and climbing on steep grades.

17. A downhill winch may be used to pull a pipe cart up-grade to deliver additional pipe sections.

18. The upper rotator frame of the vehicle may incorporate an extendable counterweight.

19. The vehicle may be used as a material-handling crane around the job site.

The above description is not intended to limit the meaning of the words used in the following claims that define the invention. Persons of ordinary skill in the art will understand that a variety of other designs still falling within the scope of the following claims may be envisioned and used. For example, while preferred embodiments involving a rotator platform having both side-to-side and front-to-back movement have been disclosed, in other embodiments the rotator platform may only be capable of side-to-side movement, or only front-to-back movement. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A self-propelled vehicle used to lay two or more individual, unaligned pipe sections within trenches located on sloped terrain, comprising:
    an undercarriage supporting a vehicle chassis, the undercarriage capable of climbing the sloped terrain;
    a rotating platform carried by the vehicle chassis;
    two independent winch cables configured to lift and position the two or more individual, unaligned pipe sections; and
    a boom carried by the rotating platform, the boom having an independently-powered-boom head positionable at a tilt angle offset from a longitudinal axis forming a centerline of the boom, wherein the angled boom head is capable of using the two independent winch cables to lift and position the two or more individual, unaligned pipe sections;
    whereby the vehicle is useable to sequentially lift the two or more unaligned pipe sections, one at a time, and to swing and position the pipe sections in a trench, end-to-end, without the need to relocate the vehicle.

2. The vehicle of claim 1, wherein the tilt angle of the angled boom head is angle of between about 50°-59°.

3. The vehicle of claim 1, wherein the individual pipe sections have differing lengths and differing diameters.

4. The vehicle of claim 1, wherein the rotating platform is capable of being maintained in a level, horizontal plane relative to the sloped terrain, while the vehicle is used to lay the two or more individual, unaligned pipe sections in the trenches.

5. The vehicle of claim 1, wherein a pivot of the angled boom head, and a pivot of the two winch cables, share a common center point, thereby enabling an insubstantial change in hook height when a tilt angle of the angled boom head is changed to align one of the individual pipe sections with the trench.

6. The vehicle of claim 1, wherein the rotating platform is capable of continuous 360° rotation, and an engine is mounted to the rotating platform.

7. The vehicle of claim 1, wherein the undercarriage comprises a tracked undercarriage.

8. The vehicle of claim 1, wherein the vehicle is capable of moving along grades up to about 45°-50° front-to-back and up to 15° side-to-side.

9. The vehicle of claim 1, wherein movement of the vehicles and laying of the pipe sections are controlled remotely.

10. The vehicle of claim 1, wherein the boom is extendible, and has an extended capacity of at least 20,000 pounds at a 30° boom angle.

11. The vehicle of claim 1, wherein the vehicle is capable of trench-laying pipe sections up to 42-inches OD and up to 40-feet long.

12. The vehicle of claim 1, further comprising dual 35,000-pound winches and wherein the boom is capable of achieving a boom angle of at least about 60°.

13. The vehicle of claim 1, further comprising stabilizer winches mounted to a front and rear of the undercarriage.

14. The vehicle of claim 1, further comprising an uphill winch to facilitate the vehicle climbing up steep grades.

15. The vehicle of claim 1, further comprising a downhill winch useable to pull a pipe cart up-grade, and to deliver additional pipe sections.

16. The vehicle of claim 1, wherein the rotating platform incorporates an extendible counterweight.

17. A method for using a self-propelled vehicle to lay two or more individual, unaligned pipe sections within trenches located on sloped terrain, the vehicle having an undercarriage capable of climbing the sloped terrain, a vehicle chassis supporting a rotating platform, and a boom carried by the rotating platform, the boom having an angled boom head positionable at a tilt angle offset from a longitudinal axis forming a centerline of the boom, comprising the steps of:
    while maintaining the rotating platform in a substantially level, horizontal plane relative to the sloped terrain, using the boom and the angled boom head to manipulate two independent winch cables in order to lift and position the two or more individual, unaligned pipe sections, whereby the vehicle is useable to sequentially lift the individual pipe sections, one at a time, and to swing and position the individual pipe sections in a trench, end-to-end, without the need to relocate the vehicle.

18. The method of claim 17, wherein the individual pipe sections have differing lengths and differing diameters.

19. The method of claim 17, wherein a pivot of the angled boom head, and a pivot of the two winch cables, share a common center point, thereby enabling an insubstantial change in hook height when the tilt angle of the angled boom head is changed to align a pipe section with the trench.

20. The method of claim 17, further comprising the step of maintaining the rotating platform in a level, horizontal plane relative to the sloped terrain, while the vehicle is used to lay the pipe sections in the trenches.

* * * * *

UNITED STATES PATENT AND TRADEMARK OFFICE
CERTIFICATE OF CORRECTION

| | | |
|---|---|---|
| PATENT NO. | : 10,526,054 B2 | Page 1 of 1 |
| APPLICATION NO. | : 16/267839 | |
| DATED | : January 7, 2020 | |
| INVENTOR(S) | : Ralph Edward McConnell | |

It is certified that error appears in the above-identified patent and that said Letters Patent is hereby corrected as shown below:

In the Claims

Column 8, Line 25, In Claim 9 the s needs to be removed in the word --vehicle--.

Signed and Sealed this
Eighteenth Day of February, 2020

Andrei Iancu
*Director of the United States Patent and Trademark Office*